United States Patent [19]

Angst

[11] 4,155,413
[45] May 22, 1979

[54] LOAD WEIGHING SCALE

[75] Inventor: Walter Angst, Zumikon, Switzerland

[73] Assignee: Ackeret Design Studios, Ebmatingen, Switzerland

[21] Appl. No.: 847,243

[22] Filed: Oct. 31, 1977

[30] Foreign Application Priority Data

Feb. 18, 1977 [DE] Fed. Rep. of Germany ....... 2707083

[51] Int. Cl.² .............................................. G01G 23/32
[52] U.S. Cl. ................................ 177/178; 177/DIG. 3
[58] Field of Search ......................... 177/178, DIG. 3; 116/DIG. 5; 350/168

[56] References Cited

U.S. PATENT DOCUMENTS

| | | | |
|---|---|---|---|
| 3,726,250 | 4/1973 | Merk | 116/DIG. 5 |
| 3,853,191 | 12/1974 | Yamagiwa | 177/DIG. 3 |
| 3,961,676 | 6/1976 | Terraillon | 177/178 |
| 4,017,157 | 4/1977 | van Riet | 177/DIG. 6 |

FOREIGN PATENT DOCUMENTS

2363601  7/1974  Fed. Rep. of Germany .... 177/DIG. 3

*Primary Examiner*—George H. Miller, Jr.
*Attorney, Agent, or Firm*—H. Dale Palmatier

[57] ABSTRACT

A bathroom scale with a multi-digit seven segment display of the sensed weight including a movable weighing platform, a lever bridge system and a bias spring resisting and deforming under the load on the platform, a movable code carrier which may rotate, a gear system between the bias spring bridge linkage and code carrier, a code strip with a multiplicity of transparent and opaque areas arranged in a code, an indexing system to stop the code carrier only a predetermined code implements, the indexing system including a magnet or lock, and a generally ladder shaped latch defining indexing implements stopping the code carrier at predetermined positions, a yieldable member in the gearing system, a multi-digit seven segment display including stacked light transmitting plates with light inlets adjacent the code strip of the carrier and light outlets directing light for viewing in a direction orthogonally of the stacked plates.

48 Claims, 36 Drawing Figures

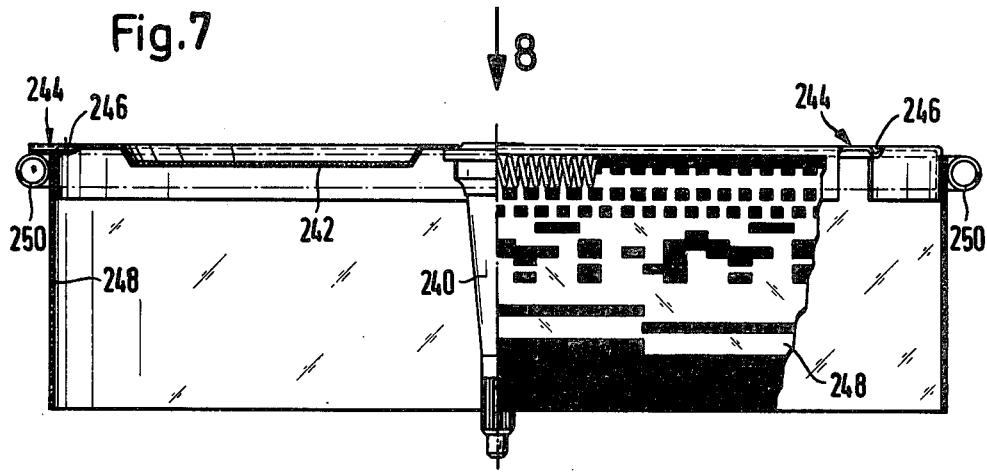
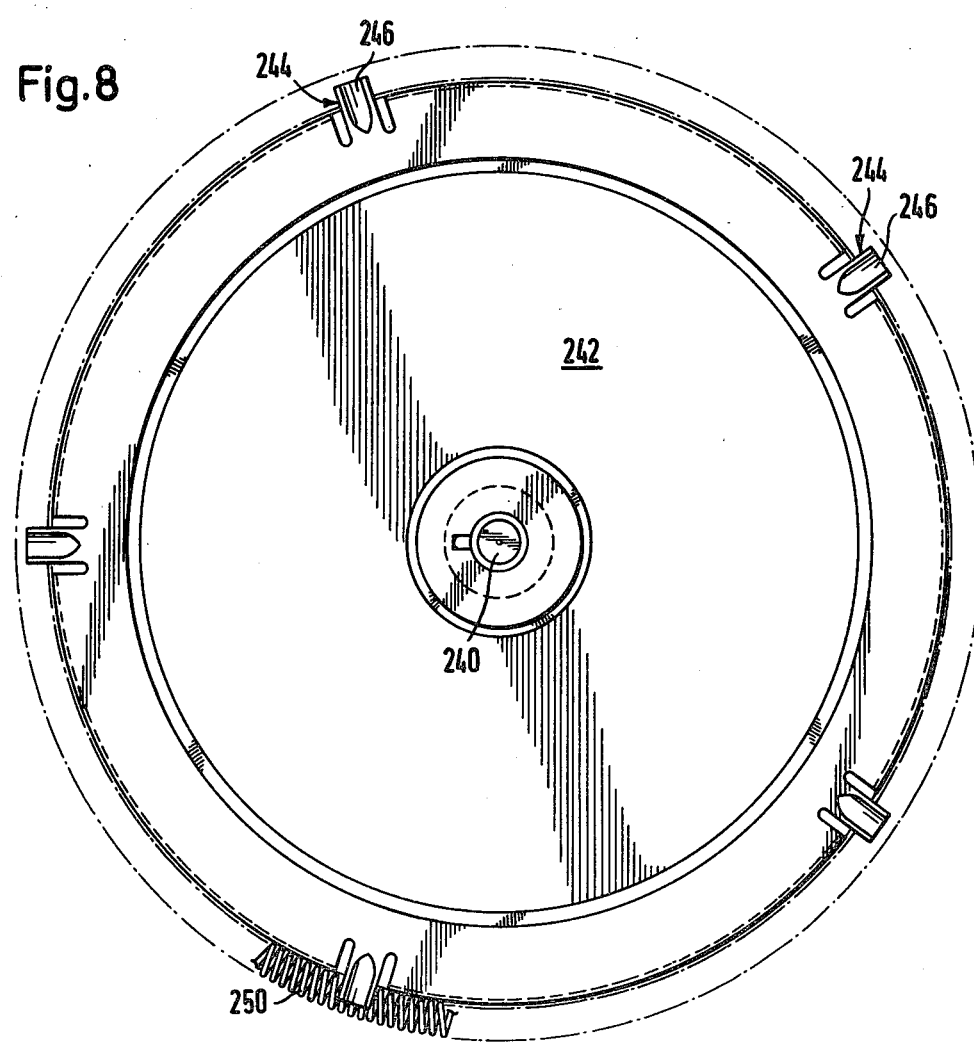

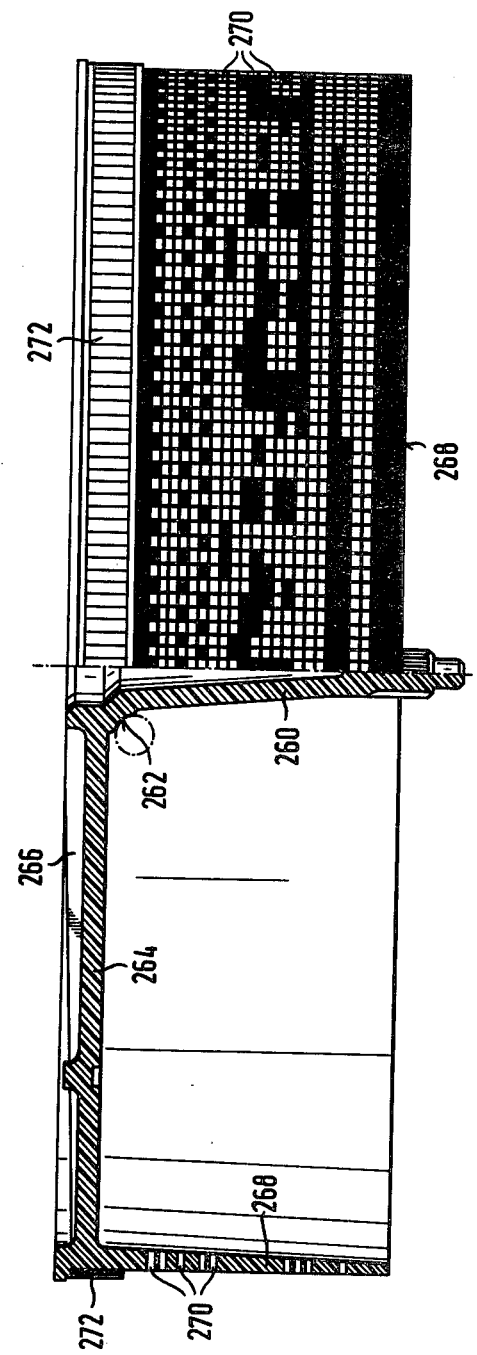

LOAD WEIGHING SCALE

This invention relates to a bathroom scale.

BACKGROUND OF THE INVENTION

Conventional scales for bathrooms or kitchen scales or the like are generally designed as spring balances. The balance platform moves upon being loaded a lever bridge system against the force of a proportionally deformed bias spring, said deformation reckoned from a zero postion being displayed. For the display for example a toothed rack is provided translatorily moved in response to the spring deformation, the rack engaging a pinion. The pinion carries a dial disc the relative position thereof with respect to a stationary mark being visible. Instead of a bias spring, the reactive force may be provided by a counterweight deflected in response to the load.

The dial scale is provided with a graduation indicating intervals of, for example, 0.5 Kg; intermediate values must be interpolated by the user which interpolation necessarily is inaccurate. For this reason it has been tried to provide the interpolation already within the scale and to display only the digital value most proximate to the weighing result, steps of, say, 0.5 Kg being provided.

As an example DT-OS 23 30 416 discloses a scale wherein the scale disc carries a code with respectively transparent and opaque areas respectively permitting and blocking the irradiation of photo transistors. By means of the photo transistors a light cipher display is controlled, the code being, of course, correspondingly designed. In this known scale, however, there is no definite display if the disc will come to a standstill just between two codes, so that depending upon the chosen dimensions it remains incidental whether the code is positioned sufficiently accurately between light source and photo transistor.

The scale disclosed in DT-OS 24 29 059 operates with motor servo regulation and counting of the revolutions of the motor shaft, the count being electronically displayed in digital fashion. This solution is unacceptable for bath scales and the like for reasons of the expenses.

A transducer to transform the mechanical length signal into an electrical digitally displayed signal is provided in the scale disclosed in FR-OS 73 24 097, however, this design being unsuited for household scales due to the inordinately high cost.

The scale disclosed in DT-OS 23 33 195 comprises a code plate instead of the scale disc, the code being formed by electrically conducting and insulating, respectively, surface portions. Upon standstill of the disc on termination of a weighing operation the cose is scanned by means of a set of electrically conductive collectors and thereafter electro-optically transducer by means of switched lamps and photo-transistors and finally displayed on a seven segment display. The code disc is provided with an indexing system, such that the disc may assume only certain preferred positions wherein the code is unambiguously scanned. This solution, however, suffers the unpermissable drawback of a high reaction to the weighing itself; if on the other hand one would design the indexing system with a force sufficiently small that the reaction could be neglected, this force would be insufficient to turn the disc into the preferred position.

Finally DT-OS 23 49 764 discloses a scale having no ambiguity of the display and having no reaction unto the weighing system. Again a code plate or drum provided with an optical code is scanned and the position of the code carrier relative to its rest position is digitally displayed. The code carrier is illuminated by means of one single light source and each segment of a multidigit sgement display is formed by the end of the fibre optical light guide. There is no indexing of the code carrier, the latter thus proportionally following the deflection of the weighing system. In order to exclude intermediate positions for the optical scanning the code carrier additionally is provided with an auxiliary code corresponding to a desired index. The auxiliary code, too, is optically scanned, and feeds, unless the position of the code carrier permits an immediate readout, a servo signal for a servo mechanism by means of which the light inlets of the light guides are moved relative to the scale housing and to the code carrier into the most proximate index position, the movement of the light guide inlets being analog to the indexing error or being performed in one predetermined step. Such a servo motor, of course, involves additional complexity and expenses and it must be assumed that the design is liable to failures over long term operation. The servo mechanism requires in each case additional energy source and the flexible fibre optical light guides are difficult to assemble.

SUMMARY OF THE INVENTION

It is the object of the invention to provide with most simple and inexpensive means, a reliable optically and digitally displaying scale which needs at most for the light source a power source which, however, can be so small that it may be inserted into the scale housing.

The solution in accordance with the invention is based upon the consideration that the digitalizing or interpolation may be provided without loss of power and free of reaction if the coupling to the weighing system is not made rigidly but elastically provided that the mechanical dimensions are correctly adapted to each other. A magnetic indexing system meets the requirement of durable reliability because of the lack of mechanical friction. The optical scanning of the code carrier which according to the invention moves only incrementally thus can be made very simply because the entire remaining optical system can remain stationary. Since, moveover, the code carrier will always come to a properly aligned standstill, the light inlets of the light guides may have substantially the same dimensions as one code increment so that the limited space is used to an optimum. The plate shaped light guides finally may be inexpensively manufactured by injection molding and form compact, rugged, easily assembled piles, notwithstanding the fact that no light exit need be covered by another plate and thus a maximum of contrast can be obtained, this maximum contrast in turn permitting use of only a small fish lamp bulb readily available on the market.

Embodiments of the invention will be explained hereunder with reference to the accompanying drawings.

BRIEF DESCRIPTION OF DRAWINGS

FIG. 7 is an elevation view, partly broken away and shown in section, of a third embodiment for the movable subassembly.

FIG. 8 is a top plan view of the subassembly illustrated in FIG. 7 and viewed as indicated by arrow 8 in FIG. 7.

FIG. 9 is a side elevation partly in section of a fourth embodiment of a movable subassembly.

DETAILED SPECIFICATION

Figure 1:
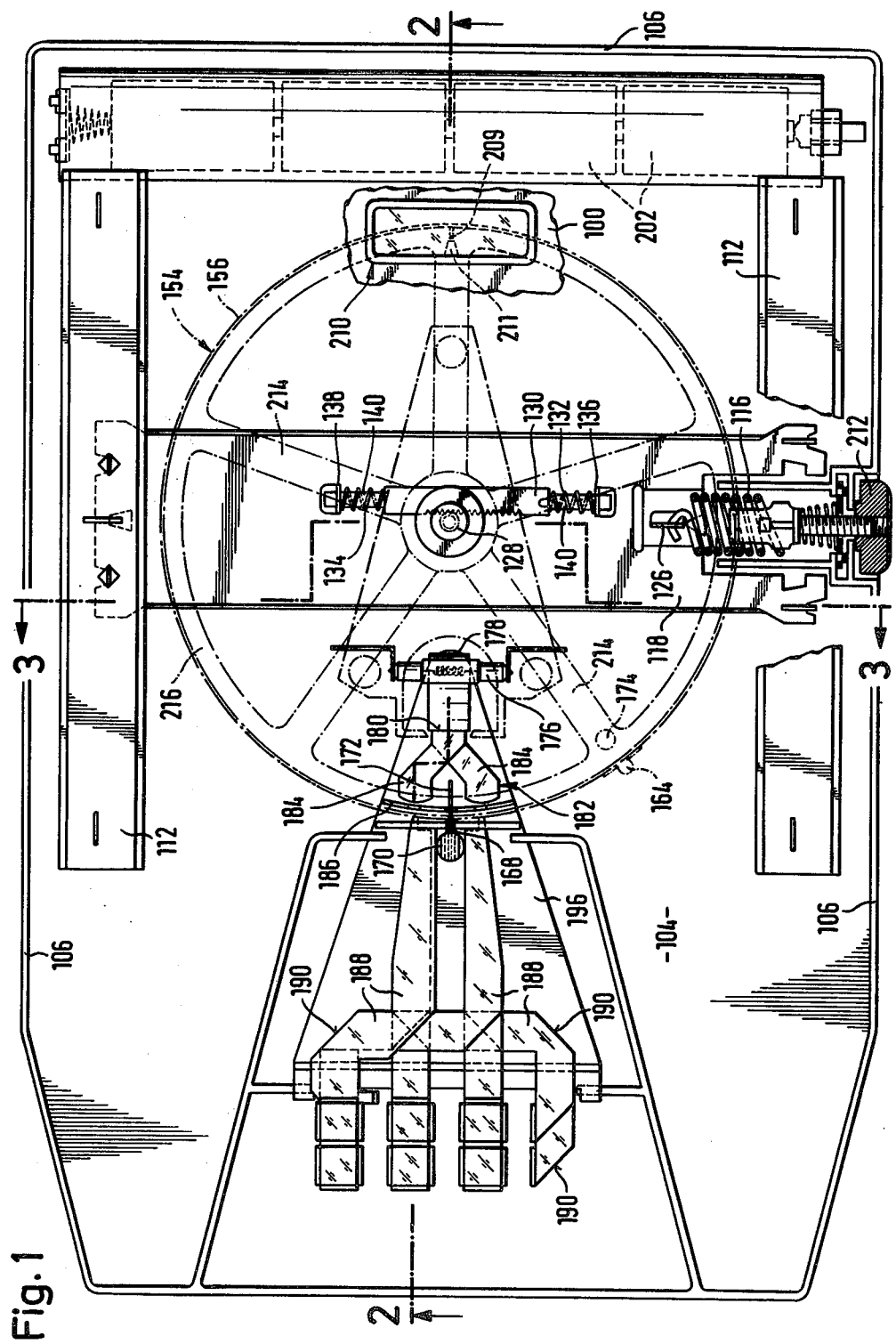
FIG. 1 is a plan view of a scale according to the invention, the scale platform being removed, and certain parts being partly broken away and other parts shown in dotted lines for clarity of detail.
Figure 2:
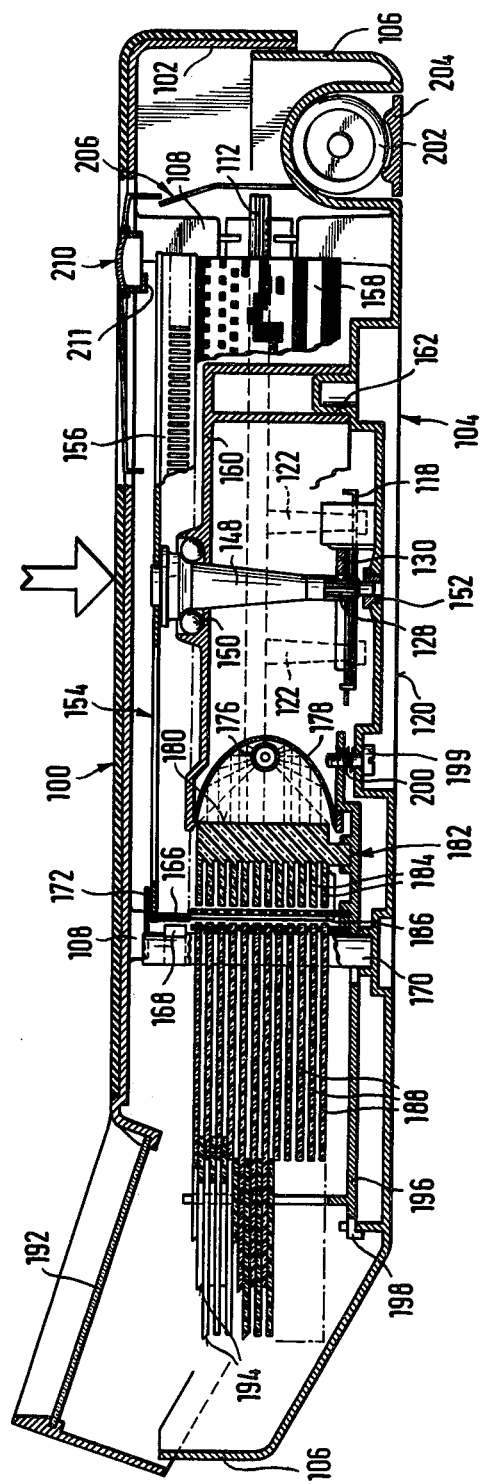
FIG. 2 is a section according to line 2—2 of FIG. 1.
Figure 3:
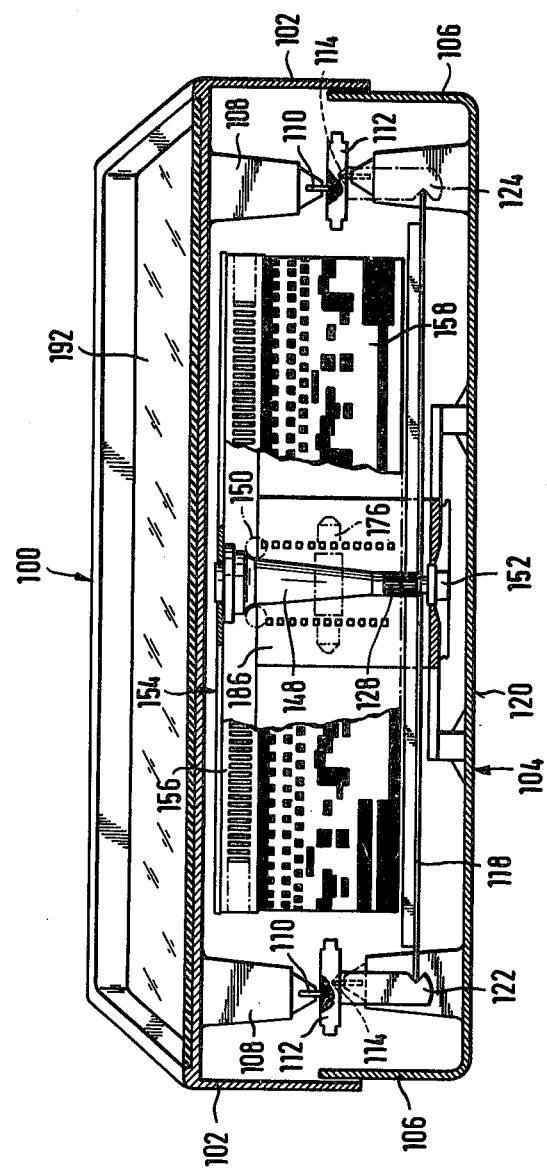
FIG. 3 is a section of line 3—3 of FIG. 1.

The scale of FIGS. 1, 2 and 3 comprises a scale platform 100 with side plates 102 bent downwardly at the platform edges and telescopically engaging over sidewalls 106 of a bottom member 104. Four depending posts 108 are connected to the platform, said posts resting on levers 112 by means of knife edged bearings 110. The levers 112 may pivot about pivot points on knife edge bearings 114 and deform the bias means, embodied in spring 116, until the platform, the lever system and the bias will have assumed again a stable equilibrium.

The deflections of levers 112 are coupled to each other so that they act simultaneously upon the spring. For this purpose a transverse bar 118 is provided extending about parallel to the bottom face 120 of bottom member 104, the bar being pivotally connected to both levers at lever arms 122 and 124. At a projection 126 cut and bent from the bar 118 the spring 116 is fastened. The bias means may alternately embody a counterweight assembly to resist translation of bar 118. The other end of spring 116 is coupled to an adjustment knob in a manner to be explained later.

The deflections of levers 112 produce longitudinal movement of the bar 118 parallel to the bottom face and are transduced into a rotational movement of a pinion 128. For this purpose a tooth rack 130 engages pinion 128, the rack, however, not being rigidly coupled to the bar but via two compression springs 132, 134. Compression spring 132 abuts with one of its ends the rack 130 and with the other end an ear 136 bent off the bar 118 similar to the ear 138. Compression spring 134 is similarly mounted between rack 130 and ear 138. Compression spring 134 is similarly mounted between rack 130 and ear 138. In the ears there are bearing apertures slidably supporting a guide shaft 140 upon which the rack is mounted and affixed.

This design or a similar one is used in conventional scales, too, which display the weight in an analog manner, and is in particular used for bath scales. However, the conventional graduated disc wedged unto the pinion is replaced by the following means:

The pinion 128 is affixed to a main shaft 148 which is carefully supported. Its bearing system comprises a radial/axial ball bearing 150 adjacent the upper main shaft end and a lower bushing or bearing 152 adjacent and beneath the pinion 128. It will be understood that the bar 118 is provided with a slot-shaped aperture through which the shaft extends into the bearing. Above the bearing 150 a code carrier or disc 154 is rigidly connected to the main shaft 148 and from the circumference of the disc, coaxially to the axis of main shaft 148 a latch 156 and a code strip 158 depend freely downwardly. Code strip 158 has a coded arrangement of transparent and opaque areas for respectively transmitting and obstructing light. Such areas are cumulatively referred to as codes.

The code strip 158 is a vital part of the optical display system. As illustrated in FIGS. 1-3 and other forms, the strip is made of transparent plastic film, but the strip could be made of opaque sheet or solid material with apertures forming the transparent areas. Code areas on the strip arranged in a vertical line, in FIG. 3, are to be simultaneously utilized to indicate a particular rotary position of the code carrier and to effect display of the sensed weight on the platform. Such code areas in vertical alignment may be cumulatively referred to as a code implement. Of course a code implement may embrace other arrangements of transparent and opaque areas, to be utilized at one time to indicate code carrier position.

The bearing 152 is inserted into the bottom of the bottom member 104 while the bearing 150 is mounted in a support 160. The support is positively connected to the bottom member 104 as indicated at 162.

A magnetic indexing system includes magnet or lock 168 and latch 156 as principal components. The latch 156 in this embodiment is a ladder shaped soft iron sheet metal strip clamped to the depending cylindrical flange 166 of disc 154 parallel to the axis by means of a clamping element 164. Latch 156 (which is described in greater detail in connection with FIGS. 17-20) has a multiplicity of closely and regularly spaced slot-shaped openings oriented transversely across the strip. Between adjacent openings are rungs or bar-shaped bridges, which effectively provide a plurality of pairs of cooperating increments in the magnetic indexing system. Between each pair of rungs or increments of the latch strip 156 is a magnetic code implement at which the code carrier of disc 154 stops under influence of the magnet or lock 168. Each magnetic implement has substantially the same length or dimension, in the direction of movement of disc or carrier 154, as the length or dimension of a single code implement in the same direction. The lock or permanent magnet 168 cooperates with the soft iron latch and particularly the bar-shaped bridges or rungs to stop the disc 154 and code strip 158 at incrementally spaced locations, referred to as code implements, according to the weight on the scale. Springs 132, 134 flex to accommodate slight disalignment tendencies at the stopping location within the space of one code implement, but not of more than one code implement. Preferably, the permanent magnet has two pole pieces for aligning the latch in such a manner that the assembly consisting of main shaft 148, disc 154, latch 156 and code strip 158, is locked incrementally by the magnetic circuit in preferred positions by means of magnetic forces. Stopping of the code carrier or disc 154 with the lock or magnet 168 aligned with any of the magnetic implements of the latch 156 results in proper alignment of a corresponding code implement of code strip 158 with other parts of the display system, as hereinafter detailed.

Since, in accordance with the invention, the balancing of magnetic force and characteristic of springs 132, 134 is necessary, these members, however, always being subject to considerable tolerances, the spring bias and/or the magnetic force must be adjustable within certain limits. For the compression springs a person skilled in the art knows the means therefor; for the magnetic circuit the air gap which determines the forces may be adjusted by movement of the magnet. The means for adjusting the magnet radially with respect to the axis of shaft 148 are not shown in detail and neither are the means for an eventually necessary offsetting in circumferential direction. In axial direction the magnetic circuit need not be adjusted. It is rigidly mounted on a socket 170 which in turn is positively fastened in the bottom of bottom member 104. A leaf spring 172 radially pointing is mounted on socket 170 and overlies the disc 154 in close relation and serves as a stop for a small dimple-shaped protuberance or lug 174 on the disc 154 for softly stopping the disc upon transitional oscillations and upon achieving of the full load deflection.

Within the cylindrical space confined by the code strip 158 a light source is provided by a tubular bulb lamp 176 and is mounted on brackets adjacent a parabolic reflector 178 which is mounted on support 160. The light beams of the light source follow substantially a path parallel to a radius of the code strip 158, parallel to the symmetry plane of the scale. The light beams impinge upon the light inlet surface 180 of a light section transducer 182 which is injection molded of transparent plastic material. By means of the branches 184 of said transducer the light is guided through the openings of the stationary plate-like mask 186 unto the code strip. The code on the code strip either permits passage of the light so that it will impinge upon the light inlet surfaces of flat plane segment display light guides 188, or it will shield the light inlet surfaces against the light. The light guides 188 have totally reflecting edges 190 and likewise totally reflecting prism surfaces 194 reflecting the light by 90° from the plate plane upwardly unto a display plate 192. Each seven superposed light guide plates forms a cipher; the most significant digit need distinguish but between 0 and 1 (full load 120 Kg) and thus will use but one or at most two light guiding plates 188.

The elements: light guide plates 188, mask 186, light transducer 182, reflector 178 and lamp 176 are mounted on a common stationary support 196, clamped at 198 in the bottom of bottom member 104 and axially adjustable by means of an adjustment screw 199 and of a pressure spring 200. The adjustment by screw 199 is axial with respect to main shaft 148 and thus apt to compensate for mislevelling of the code strip 158, such that each opening of the mask will be aligned with one code line for each segment of each cipher.

The power supply for the lamp 176 is formed by four dry cell batteries 202 available on the market and housed in a chamber, provided in bottom member 104 and closed by a removable closure 204. The connection to the lamp on the one hand occurs via earth, on the other hand via a switch 206, closed upon leading of the platform 100 with at least the smallest weight to be displayed so that the lamp will draw current from the batteries only during a weighing operation. The connections are not shown in detail because an expert may readily be able to design them suitably.

Since, accordingly, lamp 176 does not operate unless the scale is loaded there is no display either of the zero position on the displayed plate. For this reason platform 100 is provided with a slight window 210 through which disc 154 is visible. The latter carries a mark 209 which is aligned with a stationary mark 211 when the code plate is in proper zero position. The zero position adjustment of disc 154 is made by knob 212 whose rotation varies the bias of spring 116.

In this embodiment the code strip 158 is clamped by means of latch 156. It will be understood that the codes must be aligned with the openings of stationary mask 186 and the light inlet of light guides 188 when the indexing system stops the rotation of the main shaft and all members connected thereto. Therefore, either the latch may be aligned during the pre-assembly of the subassembly with the code strip or the magnetic circuit may be movable in circumferential direction.

Alternative to the disposition for the zero adjustment shown in this embodiment, a further switch could be provided in electrically parallel relation to switch 206 and closed only upon actuation of knob 212.

In order to be able to replace the lamp, too, it may be accessible from the bottom face with a door or closure similar to the closure 204 for batteries 202 or it may even be disposed in a separate lamp housing.

Finally, in order to reduce the inertia moment, disc 154 is as indicated in FIG. 1 preferably formed by a few spokes 214 with a circumferential rim 216.

Figure 4:
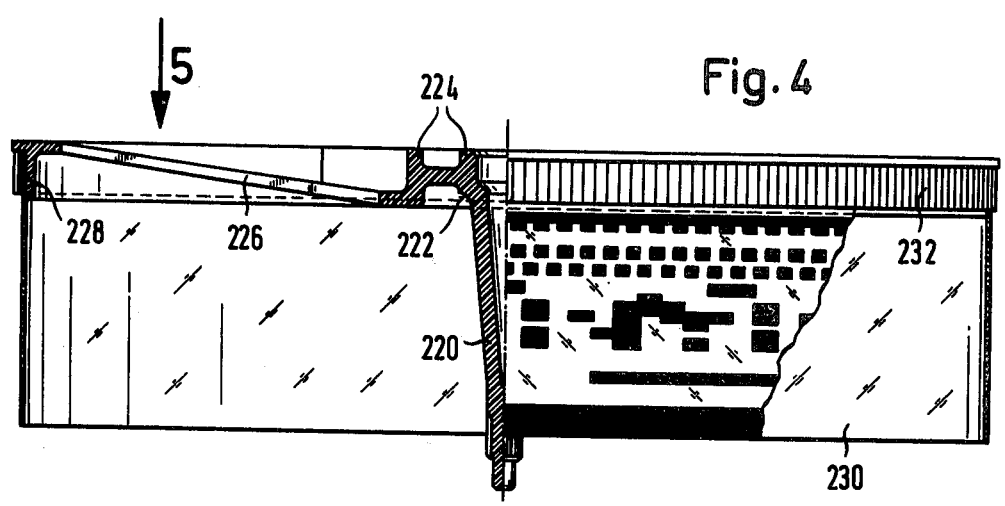
FIG. 4 is an elevation view, partly in section, through a movable subassembly in an alternative design.
Figure 5:
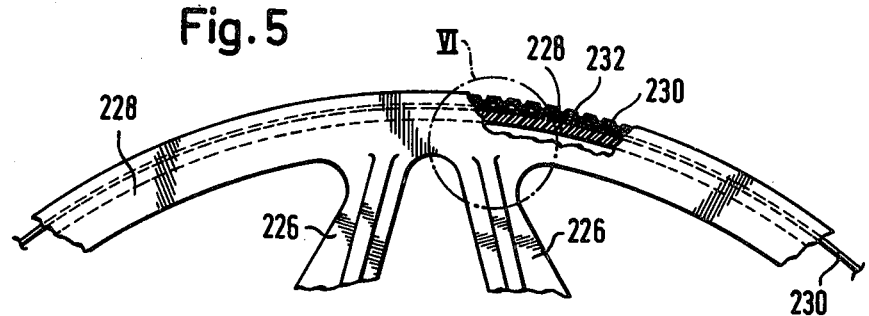
FIG. 5 is a partial plan view of the assembly shown in FIG. 4.
Figure 6:
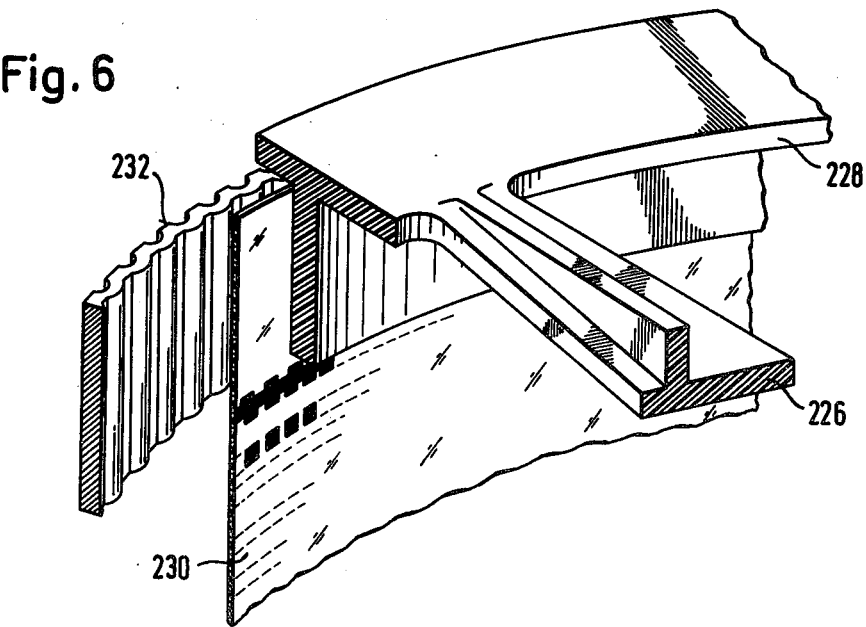
FIG. 6 is a detail perspective view of a section of the latch illustrated in FIGS. 4 and 5.

FIGS. 4-6 show an alternative embodiment of the code carrier. Main shaft 220, ball bearing inner race 222, stiffening flange 224, spokes 226 and outer rim 228 are manufactured integrally by injection molding of zinc alloy or even of plastic material. The transparent code tape 230 is partly made opaque by a printing or coating process. It is mounted by means of the soft magnetic latch 232 unto the outer rim. The latch may be a length of a strip manufactured in a continuous stamping process; it is, however, also possible to use an integral elastic polymer with inserted magnetizable particles. The rib-like portions of the surface undulations define the pairs of increments between which the magnetic implements are located.

In the embodiment of FIGS. 7 and 8 a cutout and stamped light metal disc 242 is affixed by crimping onto the solid main shaft 240. At the circumference of the disc a plurality of fingers 244 (five fingers in this case) protrude radially outwardly at the periphery of the disc and are stiffened by means of detents of grooves 246. The disc has a depending peripheral skirt defining a cylindrical, downwardly directed surface which serves as a positioning stop for the code tape 248 which again is clamped by means of soft magnetic latch 250. The latch is defined by a helically wound wire whose ends are provided adjacent the full load position with integrally formed hooks interengaging each other. The convolutions of the wound wire are spaced uniformly from each other. Main shaft 240 may be sintered of an iron alloy or may be mold estruded or may even be formed by a plastic injection molded member.

FIG. 9 shows a further economical movable code carrier. In this embodiment an integral plastic injection molded member is provided, comprising main shaft 260, race 262, disc 264 with stiffening spokes 266 and code plate 268. If opaque material is used, the transparent area of the code may be formed by apertures 270 as shown; alternatively a transparent plastic may be used and the opaque areas may be printed or transferred as a film or even transferred by means of pressured and heat from a carrier material. The latch in this case is similarly designed as in FIGS. 1-3. It is, however, also possible, in particular if in any case a printing operation is provided to print the latch 272 or to transfer it together with the opaque area by means of pressure and heat from a carrier material.

Figure 10:
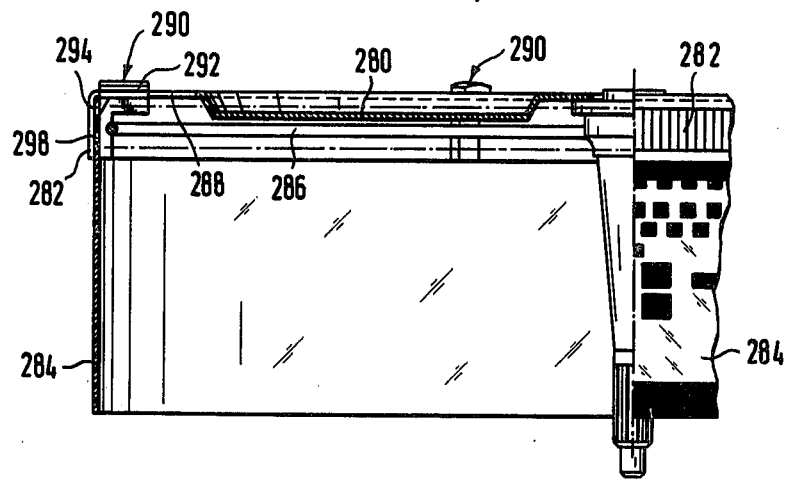
FIG. 10 is a detail elevation view, partly in section, of a fifth embodiment of a movable subassembly.
Figure 11:
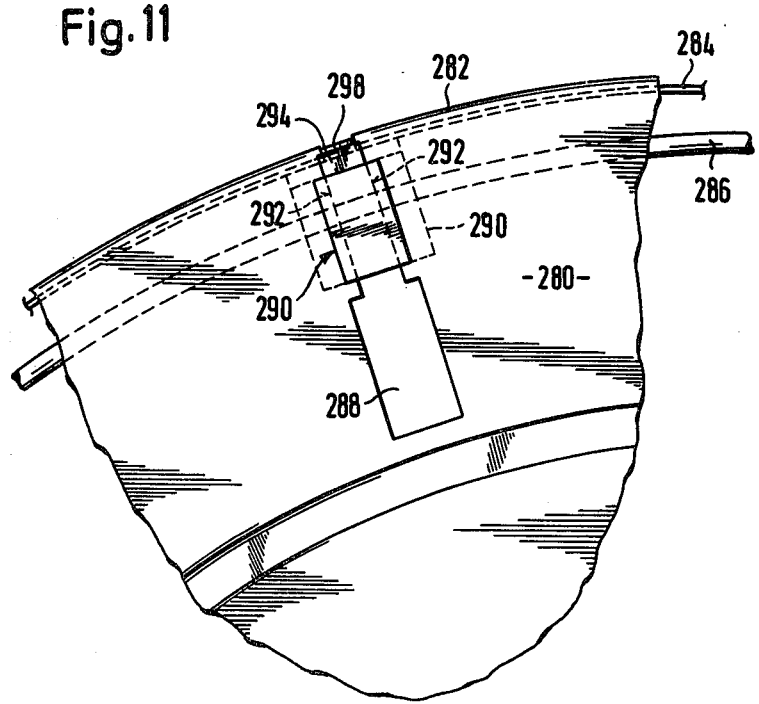
FIG. 11 is an enlarged detail plan view in direction of arrow 11 in FIG. 10 to a portion of the circumference of the subassembly.
Figure 12:
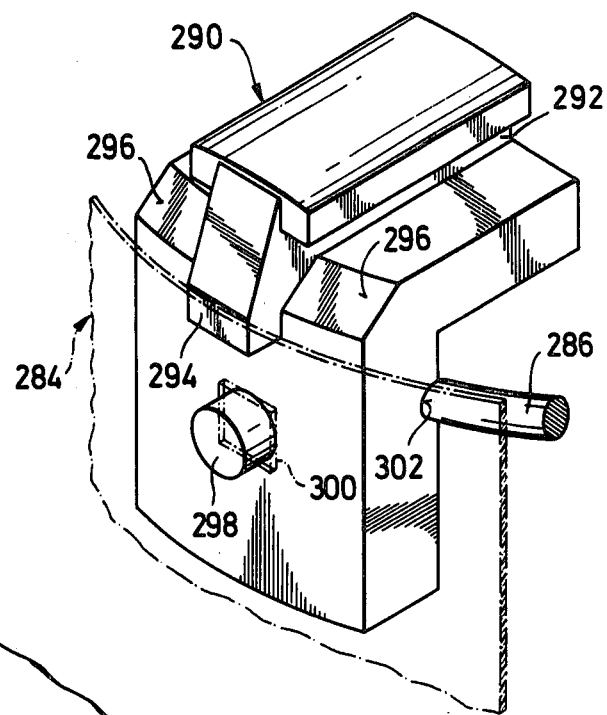
FIG. 12 is an enlarged perspective view of the pressure member used in the fifth embodiment of FIGS. 10 and 11.

FIGS. 10-12 show an alternative embodiment wherein the disc 280 and the latch 282 are integrally manufactured from soft magnetic sheet material wherein the latch 282 is a depending cylindrical flange on the disc and formed with suitable openings or indentations. The code tape 284 is pressed against the inner side of the latch 282 by means of an annular spring wire 286.

Since this flange cannot be bent with sharp edges, positive axial positioning for the code tape must be provided in another manner. For this purpose for example disc 280 is provided with five holes 288 tapering inwardly in radial direction and extending into the circumferential flange. Pressure members or slides 290 are inserted into the widening portions of the holes. The pressure members are provided with a dovetail guide 292, complementary to the tapering holes 288, and they are further provided with radially outwardly protruding projections 294 forming at their lower faces abutment stops for the code tape. The inclined portions 296 leave space for the bending curvature between disc 280 and latch 282. A pin 298 on the slide 290 extends each through a complementary aperture 300 of the code tape, and an interior circumferential groove 302 serves the positioning of spring wire 286. The pressure members 290 are preferably plastic injection molded.

Figure 13:
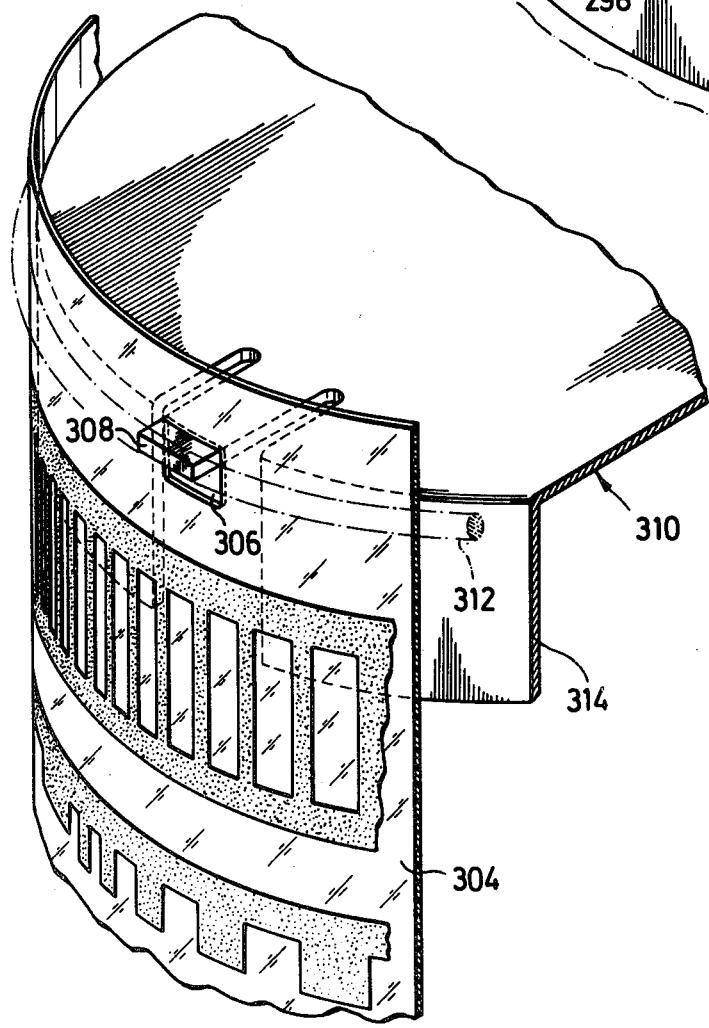
FIG. 13 is an enlarged perspective view of a portion of the circumference of a movable subassembly in a sixth embodiment.

In the embodiment of FIG. 13 the code tape and the latch are integrally formed for example by a polyester film 304 with printed on code and latch (soft iron pigment). The film 304 has apertures 306, whose shape and dimension is complementary to outwardly protruding fingers 308 of disc 310 which in turn is made of light metal sheet material. The fingers 308 serve the positioning of film 304 axially and in circumferential direction; radially it is pressed from the exterior by means of clamping ring 312 unto the circumferential flange 314 of disc 310.

Further details of the indexing system will be explained hereunder with reference to FIGS. 14-36.

Figure 14:
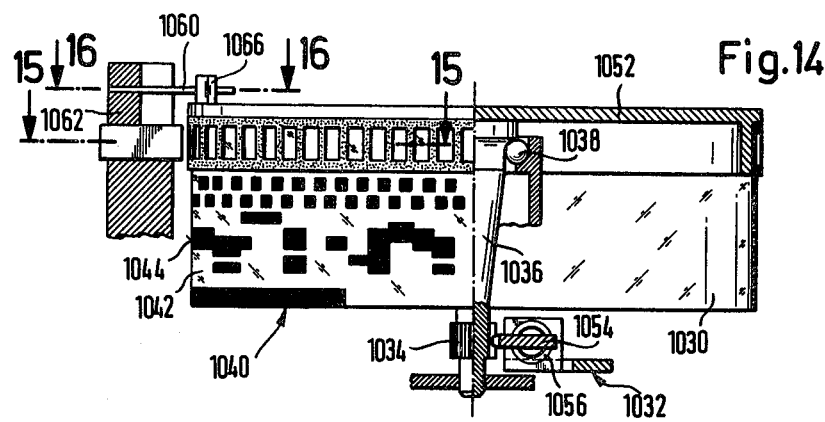
FIG. 14 is a side elevation view partly in section of an alternate form of the measuring subassembly of the scale.
Figure 15:
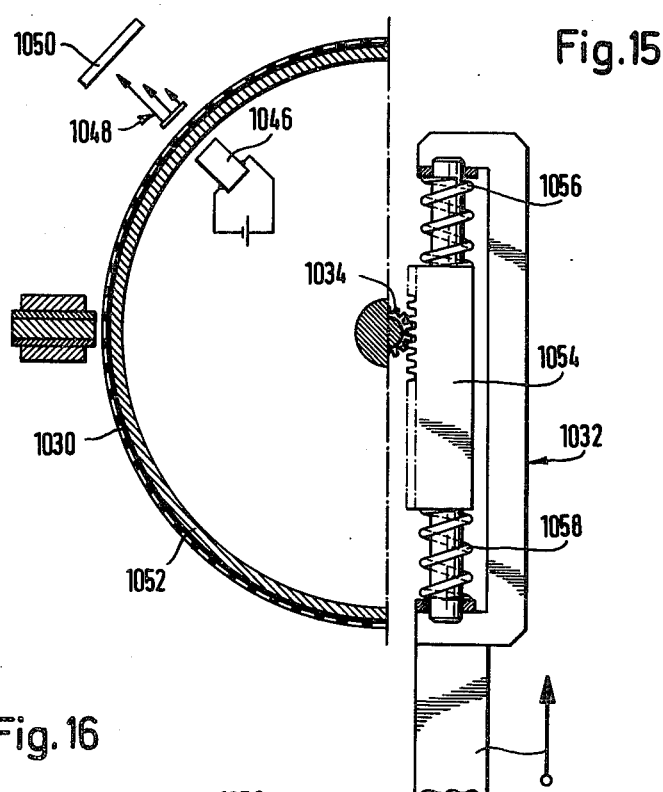
FIG. 15 is a detail section view taken along line 15—15 in FIG. 14.
Figure 16:
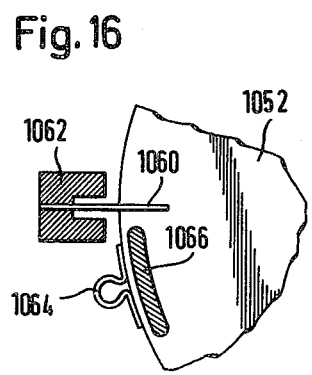
FIG. 16 is a detail section view along line 16—16 of FIG. 14.

As an example, a modified scale has been chosen in FIGS. 14-16, having a maximum weight of 100 Kg. The scale platform upon being loaded, deflects a linear measuring bar 1032 against the force of a bias spring so that the deflection is proportional to the load. The longitudinal movement of the bar 1032 is transmitted in a manner to a pinion 1034 which is affixed onto the lower end of a shaft 1036. Shaft 1036 supported by means of ball bearings 1038 carries the code plate 1030 which is designed as a cylindrical skirt. The code pattern 1040 is indicated in FIG. 14. It consists of transparent area 1042 and opaque area 1044 which in accordance with the position of the plate block the light from a light source 1046 and permit its passage, respectively, whereafter it is decoded by means of a light guide device 1048 and illuminates on a seven-segement display 1050 one or several ciphers in accordance with the code. The light source 1046, the light guides 1048, and the display 1050 are described in detail hereinafter.

The code plate 1030 in this embodiment is a plastic film clamped onto a carrier 1052. It is assumed that the pinion 1034 will make a complete revolution of 360° upon full load and that the display interpolation is to be made between weights which differ from each other by 0.5 Kg which means that the display error is 250 g maximum.

The code plate accordingly must be able to assume 100:0.5 discrete positions so that the indexing step of the system is 1.8°. Because of this small angle the indexing system will be disposed at a maximum diameter, for example at 15 cm diameter. In this case the angle corresponds to an arcuate measure of about 2.5 mm. Before the possible designs of the indexing system will be discussed, at first the transmission of the movement of member 1032 to pinion 1034 is to be explained.

The member 1032 carries slidably thereupon a portion of a toothed rack 1054, the teeth thereof engaging pinion 1034 substantially free of backlash. The neutral position of the rack 1054 is determined by two compression springs 1056, 1058 abutting on the one hand member 1032, on the other hand rack 1054; eventually one spring would be sufficient fastened at both said members. The bias of the springs 1056, 1058 is extremely small.

If the scale is suddenly subjected to a load due to the elasticity of the biasing spring of the weighing system, an oscillatable attenuated system is excited resulting in an oscillation of the member 1032 about its final position, this oscillation being transmitted to the rack 1054, delayed by springs 1056, 1058. The magnetic indexing system acts now in a manner to be described later upon the pinion 1034, tending to stop it in indexing positions; the indexing positions correspond, of course, to those relative positions of code plate 1030 and light guides 1048 that the latter are facing umabiguously either to an opaque or a transparent area of the code plate, but never to a borderline therebetween.

The springs 1056, 1058 or an equivalent resilient system are dimensioned with respect to their force-deflection-characteristic in such a manner that they will yield just within one increment to be interpolated so that the pinion will lock itself onto an index position, however, will prevent the locking at any indexing position therebefore or thereafter. Within the adjustment increment, one could also provide a dead-way between the rack 1054 and the member 1032, limited by stops. However, in such a case the displayed result would be determined in dependence upon the side from which the code plate would finally come to a standstill at the end of the oscillations so that the average error would be greater, which is to be eliminated.

FIG. 16 shows that the transitions during the oscillations suitably are stopped elastically of the carrier 1052 tends to rotate more than 360°. Leaf spring 1060 serving as the stop is stationarily mounted in a support 1062 above the carrier 1052 and cooperates with a projection 1066.

Neglecting the influence of this additional distortion there are still two coupled oscillatable systems: The weighing mechanism with the bias spring as its elasticity, and substantially the person to be weighed as the mass, and second, the display system comprising springs 1056, 1058 and carrier 1052 with members 1030, 1036, 1034, and 1054 mounted thereupon as a pivotable pendulum. It is important to have the additional inertia introduced by the indexing system as small as possible so that the display system will come to a standstill within about the same time as the weighing system, the latter being considerably attenuated.

In summary, the following requirements should be met by the indexing system.

It should comprise a minimum of moving masses, its locking force should be adjustable within certain tolerances, its dimensions should be small, it must be aligned with the code within small tolerances, and finally, the expenses for manufacture must be extremely small.

Embodiments designed under consideration of such requirements will be explained in detail hereunder.

FIGS. 17–20 show the embodiment of the latch used in the scale of FIGS. 1–3 and 14–16. A locking permanent magnet circuit (designated hereafter as "lock") cooperates with a soft iron annulus having the shape of a ladder, designated hereinafter as "latch". The latch annulus is clamped upon carrier 1052 by means of mounting means 1064 and simultaneously clamps the code plate 1030. The alignment may be provided during assembly by means of optical devices.

The lock comprises a permanent magnet 1070 in block shape polarized in direction of its thickness d. Two pole pieces 1072 of soft iron serve the concentration of the magnetic flux onto air gap a existing between the latch 1076 and the adjacent edges of the pole pieces 1072, which must be present so that the code plate may rotate unimpededly. Each pole piece 1072 is a sheet material having a thickness of s so that the distance p between the centers of the two pole pieces is d+s.

Figure 17:
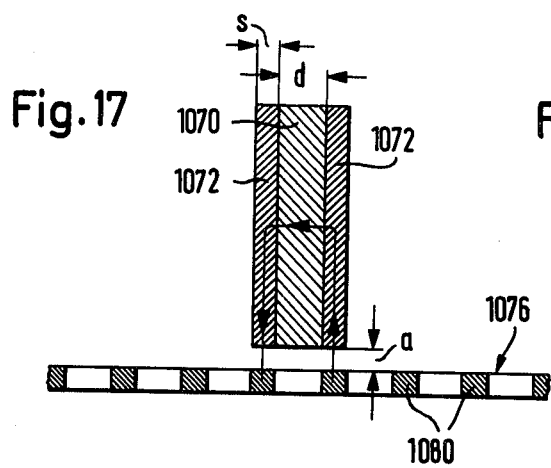
FIGS. 17-20 are enlarged detail sectional and elevational views of portions of the magnetic indexing system including dimensions which are of importance for its function.
Figure 18:
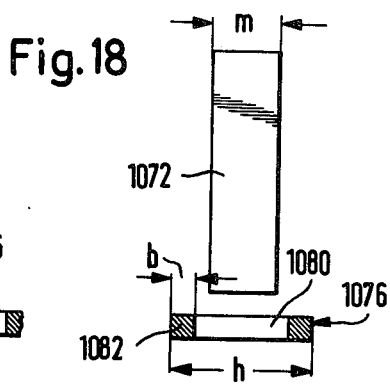
Figure 19:
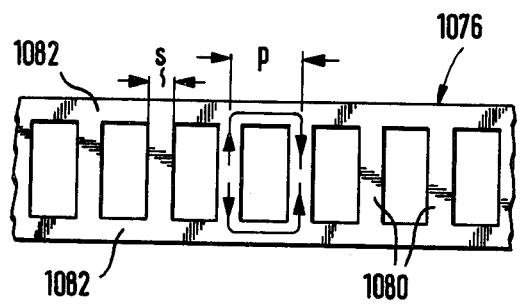

The latch shown in FIG. 19 in side elevation, in FIG. 17 in horizontal section, and in FIG. 18 in vertical section has a ladder configuration comprising rungs or bar-shaped bridges 1080 having a width s and a center spacing p and stringers 1082 having a width b equal at least to s/2. The hole width h of the ladder suitably exceeds the dimension m of the pole pieces in the area of the inner gap a so that the magnetic circuit from the edges of the pole pieces 1072 will be closed primarily via the rungs 1080 and only thereafter via the stringers 1082.

Figure 20:
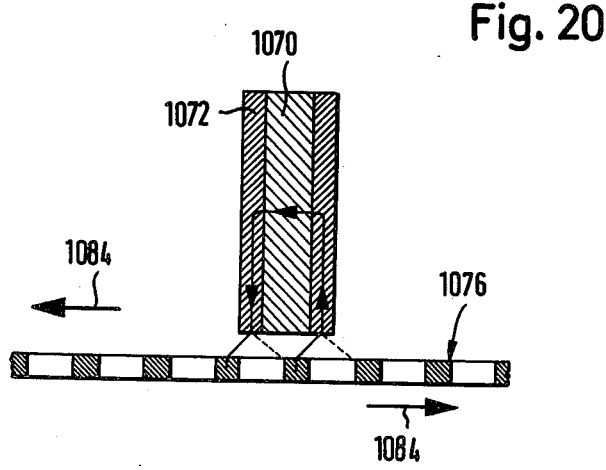

FIG. 17 shows a locking or index position with minimum total air gap of 2a while FIG. 20 shows a disbalance condition wherein the size of the effective air gap is indicated with full lines and broken lines, respectively. The shorter the air gap, the greater the attractive force. Accordingly, a relative movement in direction of arrows 1084 will occur. The probability that the code plate and the latch, respectively, will come to a standstill exactly "on center" in a position of instable equilibrium is very small since with the minimum friction of the display system, already a very small shock will suffice to destroy the instable equilibrium and will make it switch into a stable one.

Figure 21:
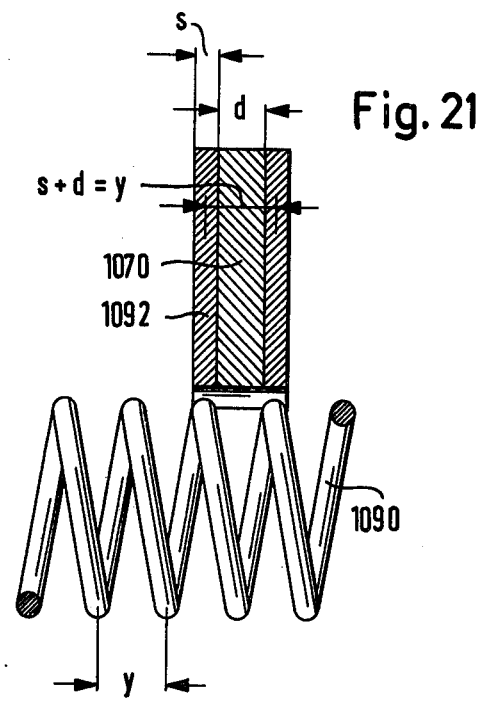
FIG. 21 is a section view of a second embodiment of an indexing system.
Figure 22:
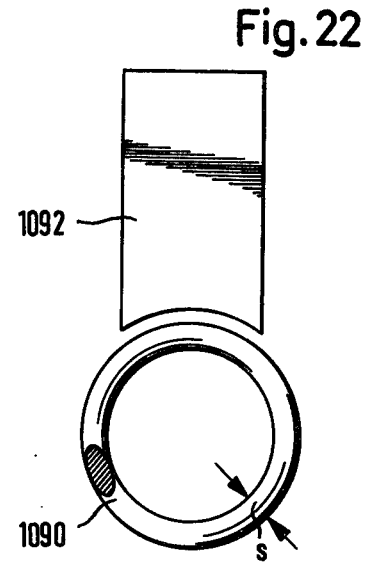
FIG. 22 is an elevation view of the apparatus of FIG. 21.

According to FIGS. 21 and 22 the latch is a helical spring 1090, like that of FIGS. 7 and 8, closed in itself and having a circular or (not shown) rectangular section shape, wound with a pitch $y=s+d$ of a wire having a thickness s. With a circular section the pole pieces 1092 have circular cut-out flux emitting edges.

Figure 23:
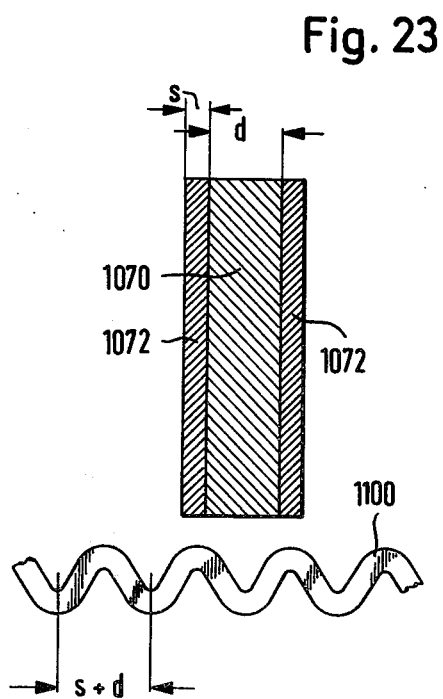
FIGS. 23 and 24 are detail section and elevation views, respectively, of a third embodiment of the indexing system.
Figure 24:
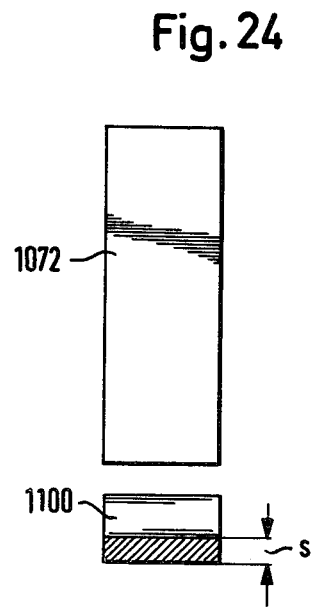

In the embodiment of FIGS. 23 and 24 the latch in this case is a corrugated sheet strip 1100, the drawings being provided with the corresponding dimensions. Such a strip may be manufactured continuously in a cold pressing process.

Figures 25, 26:
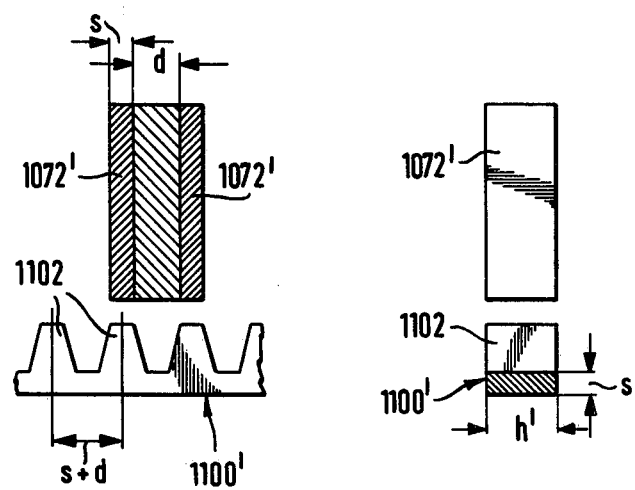
FIGS. 25 and 26 are section and elevation views, respectively, of a fourth embodiment of the indexing system.

The embodiment of FIGS. 25 and 26 comprises a stamped soft iron strip 1100 having protuberances 1102 facing the pole pieces. The width h' need be just as large as that of the pole pieces 1072'. The other relevant dimensions are indicated in the figures.

Figure 27:
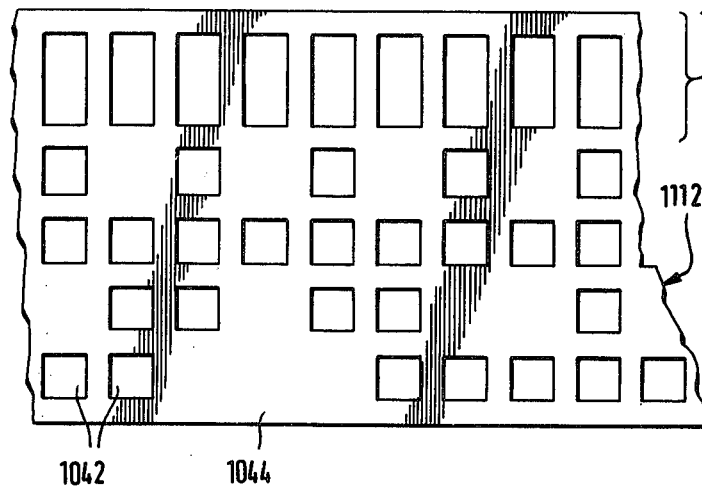
FIGS. 27 and 28 are detail elevation and section views, respectively, of a fifth embodiment of the indexing system.
Figure 28:
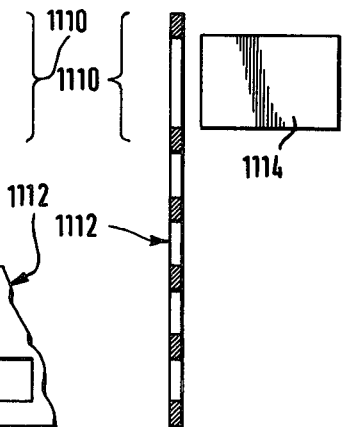

Referring to FIGS. 27, 28, if a code is used wherein between all transparent areas 1042, opaque areas 1044 will remain, the code plate may be cut together with the latch integrally of a soft iron sheet 1112. The sheet portion 1110 forming the latch is designed according to FIGS. 17–20. FIG. 28 illustrates the disposition of the lock 1114. If the cutting process is insufficiently accurate one can use an etching process as well.

Figure 29:
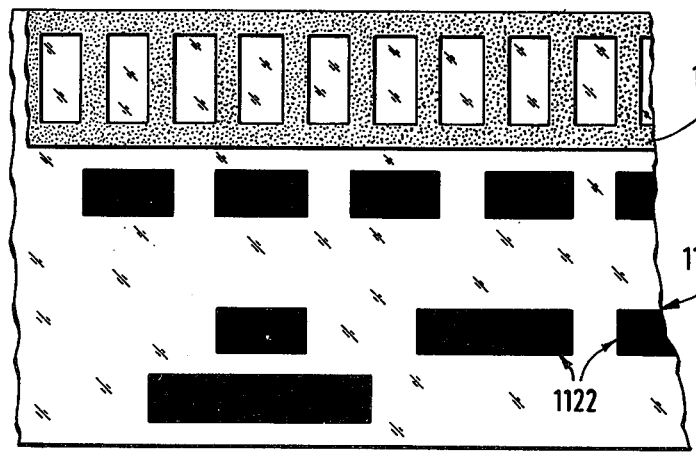
FIGS. 29 and 30 are detail elevation and section views, respectively, of a sixth embodiment of the indexing system.
Figure 30:
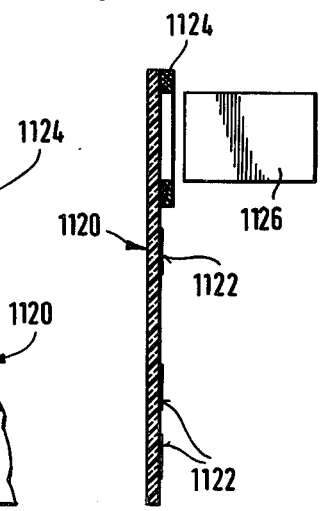

Basically similar is the embodiment of FIGS. 29 and 30. The code plate 1120 consists of a transparent plastic carrier with a code 1122 printed thereon and the latch 1124 too is printed thereupon and consists of a magnetizable pigment coating. The printing is suitably made from a polyester carrier under the influence of heat, code 1122 and latch 1124 being simultaneously transferred. The position of the lock 1126 is indicated in FIG. 30.

In all the embodiments it is of importance that the permanent magnet cannot be demagnetized by ambient fields and for this reason one will use a high-coercitive material, for example on the base of barium ferrite. The latch, on the contrary, must demagnetize itself immediately as soon as it is moved away from the operational field of the lock; this may be obtained by corresponding selection of the material (low coercitive force) and of the length/section ratio.

In the embodiments of FIGS. 17–26 the latch was manufactured as a separate member which, however, could easily be aligned with the code. It is an advantage of these designs that the latch may be inexpensively manufactured in a continuous non-machinging process.

The manufacture of the embodiments of FIGS. 27–30 on the contrary is discontinuous, however, there is no necessity for the extra alignment because this is predetermined by the printing block.

Figure 31:
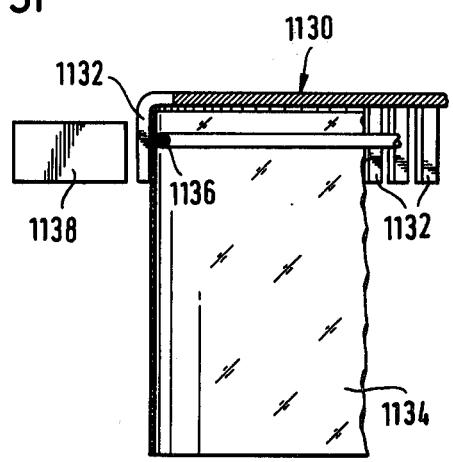
FIGS. 31 and 32 are detail section and plan views, respectively, of a seventh embodiment of the indexing system.
Figure 32:
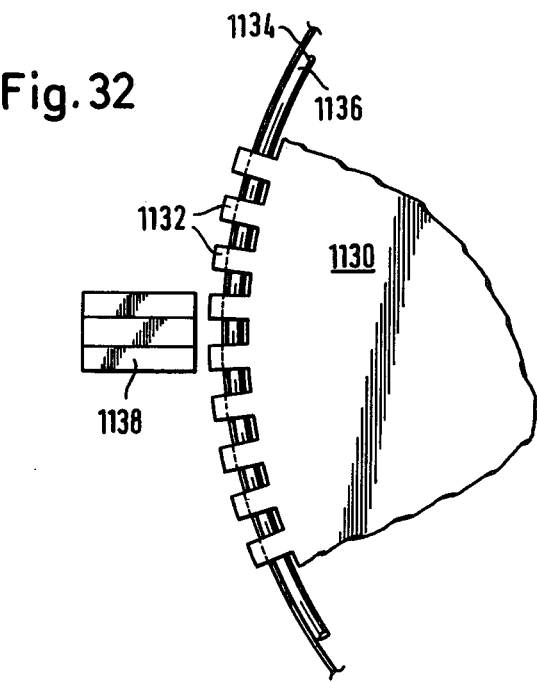

Finally, it is also possible to make the latch integral with the rotary disc, as described in connection with FIGS. 10–12. In FIGS. 31 and 32 the circumference of the carrier or disc 1130 the latch is cut and has the shape of teeth 1132; teeth 1132 may for example be orthogonally bent and form the support for code plate 1134. The code plate is pressed outwardly against the latch teeth 1132 by means of an annular spring wire 1136, for example. The relative dimensions of the latch teeth 1132 and of the lock 1138 correspond to those of the preceding examples. Alternatively, carrier, latch and code plate all together may be made integrally of soft magnetic sheet metal whereafter the code openings are cut or etched from the circumference.

It will be appreciated that in cinematic inversion, the latch may be stationary while the lock is movable with the code plate, the latter in turn not necessarily following a revolving movement but may be moved in other application cases as well translatory. Further, the spacing of the pole pieces may be an integer multiple of the latch pitch.

Figure 33:
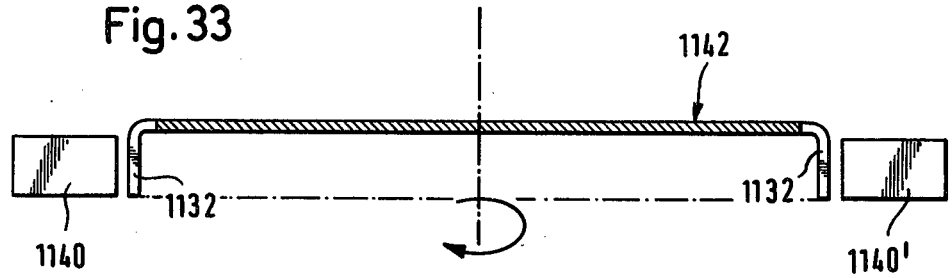

In some cases it will be advantageous or even necessary to remove from the bearings of the member which carries the latch any loads due to magnetic forces or to eliminate deformation of the latch due to magnetic forces. FIG. 33 shows schematically a device comprising two diametrically opposite locks 1140, 1140' symmetrically acting upon a latch 1142 so that the bearing thereof (not shown) is not subjected any more to unilateral forces.

Figure 34:
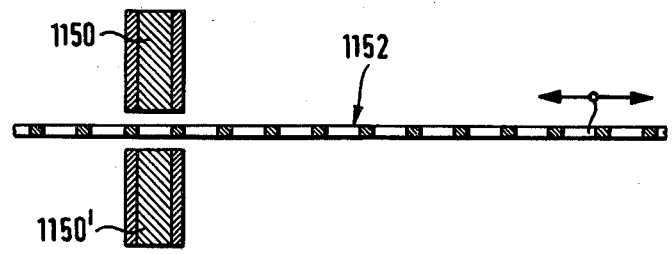
FIGS. 33 and 34 are section views of eighth and ninth embodiments of a magnetic indexing system.

FIG. 34 illustrates a device comprising two locks 1150, 1150' bilaterally disposed of the latch 1152 with the same spacing therefrom. It will be understood that in such a design eventually one single permanent magnet will be sufficient, the pole pieces thereof engaging over the latch from both sides thereof.

Further embodiments will be just briefly mentioned. One may provide two locks offset to each other by half a latch pitch so that the number of index positions or increments is doubled because the locks will be effective alternatingly. Further, for example, from a certain measure value the number of rungs may be reduced to one half and the spacing of the pole pieces may be chosen equal to twice the pitch; within this measuring range only double increments will be displayed.

Figure 36:
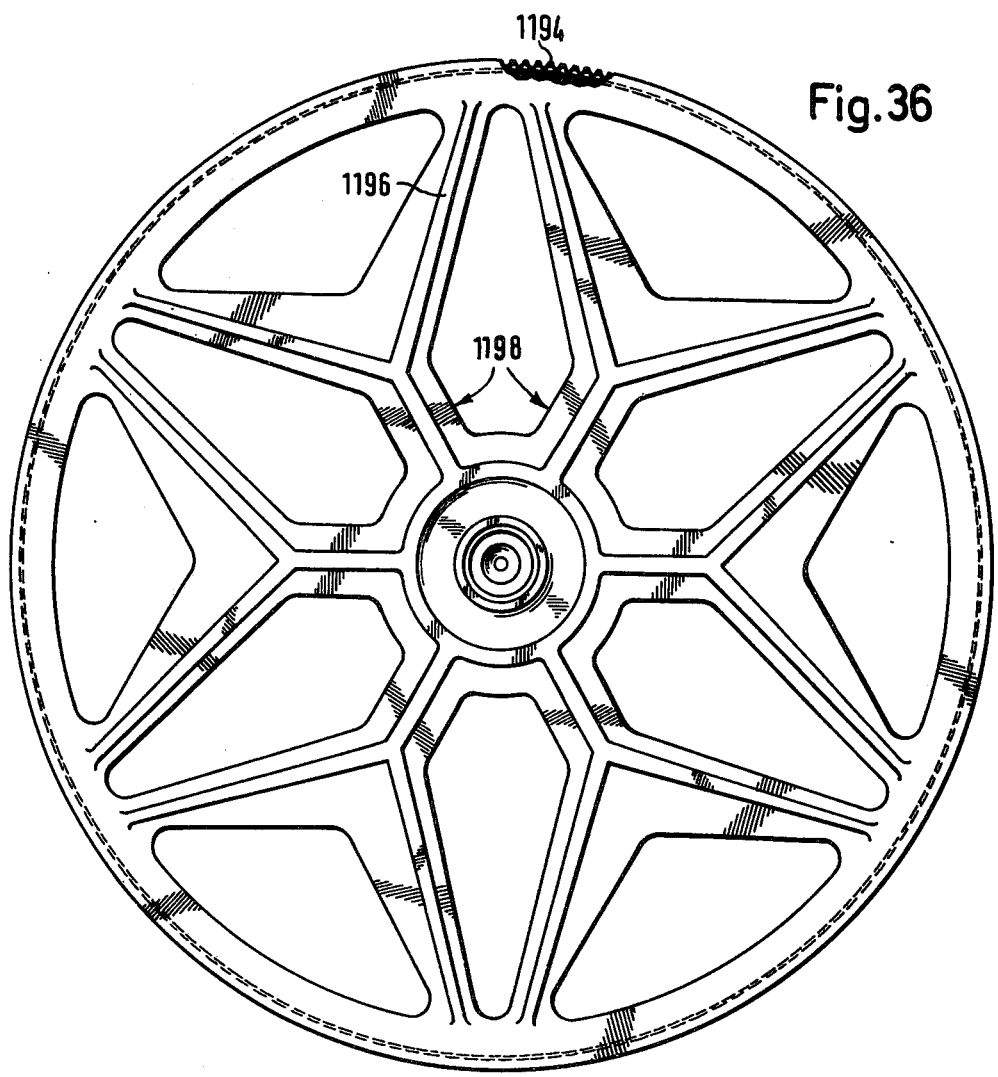
FIG. 36 is a detail plan view, partly in section, of the movable member of FIG. 6.

Further designs for the latch, etc., have been illustrated in FIGS. 8, 9, 13, 4, 5 and 6. A complete view upon the movable member of the latter embodiment is shown in FIG. 36, the latch being designated with 1194. It will be seen that the code carrier is light weight and nevertheless stable and rugged because of its being comprised of thin spokes 1196 and stiffening webs 1198.

Figure 35:
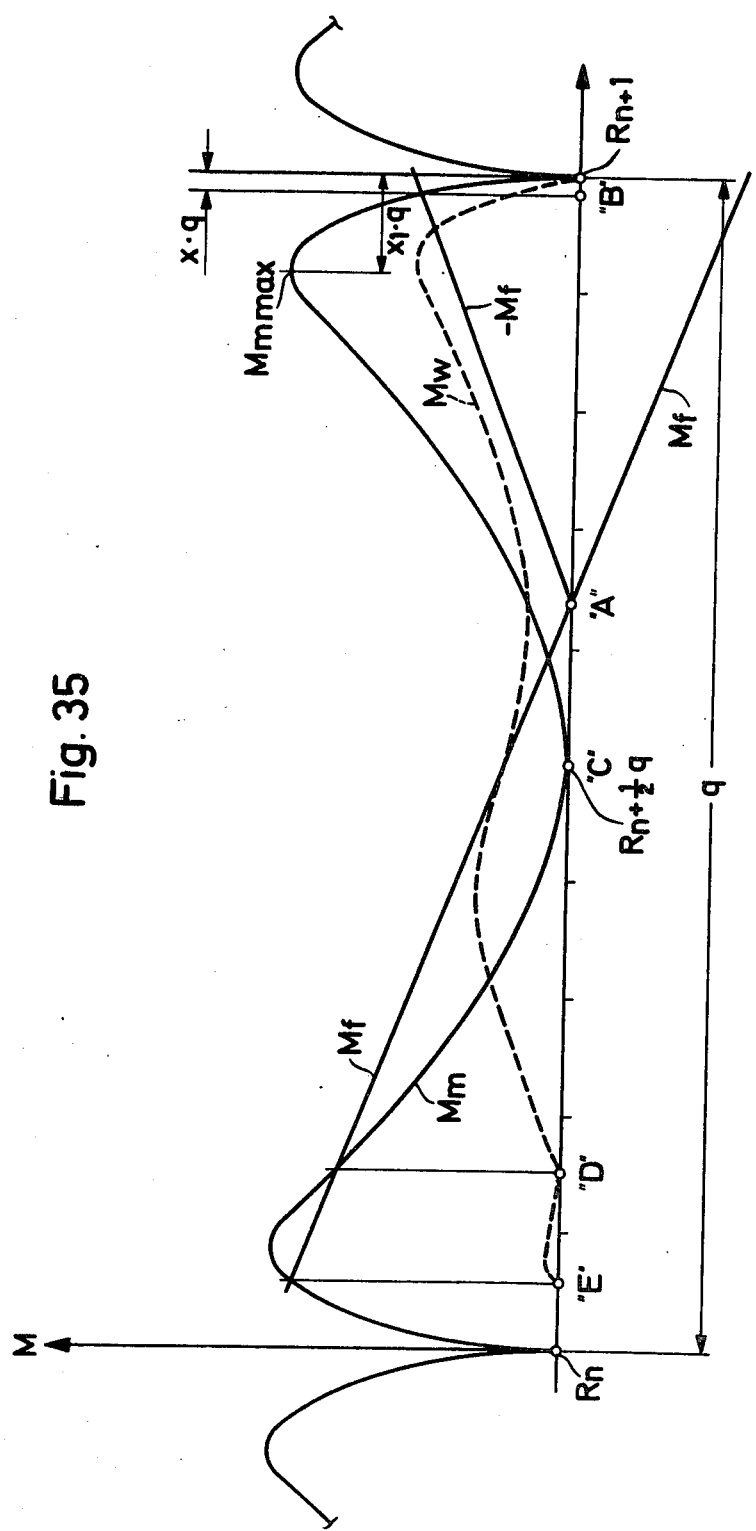
FIG. 35 is a curve wherein the torque acting upon the code carrier is plotted over the deflection thereof.

With reference to FIG. 35 the relation between the several torques acting upon the movable member will be explained in detail.

FIG. 35 is a diagram wherein the torque acting upon the code plate or code plate carrier, respectively, is plotted over the deflection of the measuring member, expressed as the arc or angle by which the code plate is rotated.

At first, in circumferential direction a torque acts upon the code plate resulting from the magnetic system. This magnetic torque $M_m$ is, of course, zero in the index positions $R_n$, $R_{n+1}$, . . . It increases from such positions steeply in both lateral directions to a maximum $M_{m\ max}$ and drops, therebeyond, almost linearly to zero again, since in any position $R_{n+1/2q}$ with q=arc travelled by the code plate between two index positions, the magnetic forces of succeeding active latch portions are equal and mutually oppositely directed. The latter position thus is an unstable balance position, because even an infinite deflection of the code plate in either direction will move it away from this position.

Superposed to the torque $M_m$ is a "spring torque" caused by the force stored in springs 1056, 1058 unless the initial code plate deflection will be congruent with one of the index positions $R_n$, $R_{n+1}$, . . .

In FIG. 35 it is assumed that the deflection of the measuring member corresponds to the position A between index positions $R_n$ and $R_{n+1}$. Torque $M_m$ will act upon the code plate tending to turn it in direction to index position $R_{n+1}$ thereby compressing, say, spring 56 while simultaneously spring 58 yields; it is assumed that both springs constantly act upon the toothed rack and that no intermediate stop means be provided. In result, straight line $M_f$ represents the countertorque developed by the springs and being proportional to the arc. The intersection of this line with the abscissa (deflection) is, of course, at A.

Seen from A in direction to $R_{n+1}$, torque $M_f$ counteracts torque $M_m$, and the net or total torque $M_w$ will result indicated in dashed lines. The code plate will come to a standstill where $M_w=0$. This point is marked B; it is offset from $R_{n+1}$ by a distance x·q representing a fraction of a deflection between two adjacent index positions. It is, of course, desired that x·q be as small as possible. With spring characteristics relative to the magnetic characteristic, as shown, a differential arc will result which is smaller than 0.05·q. This has been marked in FIG. 28 in that the spring line $M_f$ has been drawn in a negative sense as $-M_f$ so to clearly indicate its intersection with $M_m$ corresponding to $M_w=0$.

In direction to $R_n$, seen from A, the torque $M_m$ decreases further while now spring 58 is compressed and spring 56 yields; this event, in fact, will occur for the coupled systems are able to oscillate so that the rack will approach its rest position after oscillations about point A. At first, the torques $M_m$ and $M_f$ are unidirectional and tend to turn the code plate to $R_{n+1}$. Beyond point C, at $R_{n+q/2}$, torque $M_m$ will now pull in direction to $R_n$ while the torque provided by spring 58 still turns in the opposite direction, and its magnitude increases with increasing deflection. Beyond C thus the torques must be subtracted from each other, and it will be seen that at point D again $M_m=-M_f$. This position, however, is unstable again because with incremental turn in direction $R_n$, $M_m$ will prevail and the code plate will switch to E adjacent $R_n$. It will also be appreciated that the unstable area between $R_n$ and $R_{n+1}$ has disappeared so that a standstill between index positions is excluded. It will be understood that the foregoing considerations are a mere summary of a detailed calculation wherein friction forces, etc., have been considered, but with the diagram in mind an expert will readily be able to provide additional means to eliminate the remaining uncertainty in the display. Such means may comprise: Steeper spring characteristic with necessarily resulting greater x, stop means to limit the deflection of the springs to a value q/2, or even a non-linear spring characteristic, or perhaps a suitable attenuation decrement dimensioning of the oscillating system.

The foregoing explanations will permit to design the springs in relation to the magnetic indexing system. The spring characteristic should not be steeper than a straight line from C which intersects $M_{m\ max}$ since otherwise—analog deflection adjacent C—the magnetic indexing system could not react any more. The spring characteristic, on the other hand, should not be so flat that due to the unavoidable frictions the unstable range at C will be too broad. It will further be understood that it is desirable to have an $M_m$-characteristic as linear as possible between $M_{m\ max}$ and C and to make $x_1 \cdot q$ which is the abscissa value for $M_{m\ max}$ as small as possible.

What is claimed is:

1. A scale for weighing loads comprising
a scale platform, a lever bridge system,
a bias means resisting and being deformed in response to a load upon the scale platform,
an optical display system including a rotatable code carrier, a light source and a multi-digit seven segment display,
the rotatable code carrier being rotatable to various positions corresponding to the weight sensed on the platform and which position is an indication of the sensed weight, the rotatable code carrier being disposed adjacent said light source, and having a multiplicity of transparent and opaque code areas on the periphery thereof, said code areas cumulatively defining a plurality of circumferentially adjacent code implements, the code implement at each rotary position indicating the sensed weight and each code implement having a finite length or dimension in the direction of movement of the code carrier,
a gearing system for transmitting the deformation of the bias means to the rotatable code carrier,
said multi-digit seven segment display including a light guide system having a plurality of light guide and display plates piled in superposed and parallel relation to each other, the display plates having light outlets directed orthogonally to the planes of the plates, and the display plates having light inlet surfaces confronting the periphery of the code carrier and the code areas thereon and said inlet surfaces having a length in the direction of code carrier movement substantially equal to one code implement, and
an alignment device including a yieldable means in the gearing system permitting limited yielding between the relative movement of the bias means and the rotary carrier, and
the alignment device also including a magnetic indexing system including first and second cooperating magnetic members, one being stationary adjacent the code carrier and the other being movable with the code carrier, one of the magnetic members including a magnetic source and the other of the magnetic members including means defining a multiplicity of pairs of adjoining magnetic indexing increments, each pair of increments defining a magnetic implement therebetween and each pair of indexing increments cooperating with the magnetic source to stop the code carrier within a magnetic implement, the yieldable means yielding to permit the code carrier to stop within one magnetic implement to align the code areas within one code implement for causing display of the sensed weight, the dimension of each magnetic implement in the direction of movement of the code carrier substantially equaling the corresponding dimension of one code implement.

2. A scale as claimed in claim 1, and the magnetic indexing system includes a permanent magnet which in operation is stationary and a soft magnetic latch moving together with the code carrier.

3. A scale as claimed in claim 2, and the permanent magnet is mounted radially adjustable relative to the code carrier so to adjust its force and circumferentially adjustable relative to the axis of the rotatable code carrier so to adjust the alignment.

4. A scale as claimed in claim 1 and the scale having a bottom member telescopically received in the platform, the code carrier being rotatably mounted about a vertical axis supported by said bottom member, a light source subassembly and a second subassembly comprised of the light guides with a light transducer and a mask also being mounted on said bottom member, said second subassembly being level adjustable relative to the code carrier in the direction of the axis of the latter.

5. A scale as claimed in claim 4, and a chamber in the bottom member to receive a power source for the electrical light source.

6. A scale as claimed in claim 4, and the light source subassembly including a light source and power source is insertable and removable through an opening in the bottom of the bottom member and into the cylinder space confined by the code carrier.

7. A scale as claimed in claim 1, and the code carrier is hollow and cylindrical.

8. A scale as claimed in claim 7, and the axis of the code carrier being substantially upright.

9. A scale as claimed in claim 7, and the code carrier at one of its axial ends is connected to a disc which is mounted on a shaft having substantially the same axial dimensions as the code carrier.

10. A scale as claimed in claim 9, and said shaft adjacent said disc is supported in a ball bearing and is supported at its free end in a second bearing.

11. A scale as claimed in claim 9, and said light source is disposed within a cylindrical space confined by said code carrier.

12. A scale as claimed in claim 11, and the light source including a stationary mask adjacent the code carrier, apertures of said mask being aligned with the light inlet surfaces of the light guide plates which are radially outside the code carrier and piled up axially with respect to the shaft thereof.

13. A scale as claimed in claim 9, and a film code tape with the latch thereon, the film being fastened at the outer circumference of a coaxial disc rim by means of a clamping spring.

14. A scale as claimed in claim 13, and a plurality of fingers at the disc circumference and matingly engaging into apertures of said film.

15. A scale as claimed in claim 9, and the disc and the latch being integrally formed of soft magnetic material, that the disc having a coaxial outer flange and that a film code tape being pressed onto the inner circumference of the outer flange by means of a spring annulus.

16. A scale as claimed in claim 15, and pressure elements disposed adjacent the outer flange circumference and engaging the film for axial positioning of the film.

17. A scale as claimed in claim 9, and the shaft, disc and code carrier forming an integral member upon which the latch is mounted.

18. A scale as claimed in claim 17, and the code carrier including a transparent plastic member printed or coated with the latch and the opaque area of the code.

19. A scale as claimed in claim 17, and the code carrier including an opaque plastic member with apertures forming such transparent areas of the code.

20. A scale as claimed in claim 9, and a film code tape being mounted by means of the latch on the circumference of the disc.

21. A scale as claimed in claim 20, and the latch being a soft iron strip clamped on the disc circumference and clamping the code tape.

22. A scale as claimed in claim 20, the latch being a helically wound wire spanning the disc circumference.

23. A scale as claimed in claim 20, and the latch being an integral polymer ring with inserted latch member radial elastically spanning the code tape unto a disc flange.

24. A scale as claimed in claim 9 and the disc being disposed adjacent the platform and at the end of the shaft.

25. A scale as claimed in claim 24, and a switch for said light source and actuated upon a determined load upon and movement of the platform.

26. A scale as claimed in claim 25, and the platform includes a window with a mark through which the upper face of the disc carrying a zero adjustment mark is visible.

27. A scale as claimed in claim 25, and an auxiliary switch is connected in parallel to said first switch, the auxiliary switch being closed upon actuation of a zero adjustment system.

28. A digital optical display device for indicating the position of a movable measuring member, relative to its rest position, the device comprising a code plate adapted to be moved by said measuring member substantially proportionately and provided with a code pattern consisting of opaque and transparent areas, the code plate being irradiated by a stationary light source from one side of the plate while at the other side inlets of light guides of a seven digit display are mounted in accordance with the code pattern, an unambiguous display being possible only in certain relative positions of code plate and light guide inlets, the code plate being operatively connected to a magnetic indexing system providing stepped locking positions corresponding to said certain relative positions, while the light source and light guides are stationary, and there being a yieldable means between the measuring member and the code plate permitting yielding in the movement of the code plate within the magnitude of one magnet indexing step.

29. A device as claimed in claim 28, and said yieldable means comprises springs which have a characteristic adapted to the locking force of said magnetic indexing system in such a manner that it is non-yielding within the magnitude of two magnetic locking steps.

30. A device as claimed in claim 28, and said magnetic indexing system comprises a stationary permanent magnet system with a lock and a soft magnetic latch movable together with said code plate.

31. A device as claimed in claim 30, and the latch being a corrugated tape with proturberances facing the lock.

32. A device as claimed in claim 30, and the latch comprising a movable carrier having stamped protuberances.

33. A device as claimed in claim 30, and the latch being made of a helical wire having a pitch corresponding to the indexing steps.

34. A device as claimed in claim 33 and the code plate being rotatably mounted on a rotatable carrier, the latch being a clamping annulus for mounting the code plate on the carrier.

35. A device as claimed in claim 30, and the latch is integral with a movable carrier mounting the code plate.

36. A device as claimed in claim 35, a rotatable code plate, said carrier being a rotary disc having teeth at its circumference, said teeth being bent orthogonally with respect to the plane of the disc and serving as the latch, said code plate being resiliently pressed onto said teeth which serve as abuttments for the code plate.

37. A device as claimed in claim 35, and the carrier, the code tape and the latch being integrally formed of a soft magnet sheet metal.

38. A device as claimed in claim 30, and including a plurality of locks.

39. A device as claimed in claim 38, and the code plate being rotatably mounted on a bearing, and all of said locks being mounted such that their forces compensate each other relative to the bearing of the code plate.

40. A device as claimed in claim 38, and the locks being disposed bilaterally of a latch.

41. A device as claimed in claim 30, and the latch being a tape in ladder configuration wherin the rungs spacing defines the locking increments.

42. A device as claimed in claim 41, and the tape and the code are printed on the carrier.

43. A device as claimed in claim 41, and the code plate being rotatably mounted on a rotatable carrier, and the tape being a clamping annulus for mounting the code plate on the carrier.

44. A device as claimed in claim 43, and the latch being elastic in the direction of its movement.

45. A device as claimed in claim 41, and the tape being integrally formed with the code plate.

46. A device as claimed in claim 45, and the tape with the code plate is made by a cutting operation.

47. A device as claimed in claim 45, and the tape and the code are mounted on a transparent carrier.

48. A device as claimed in claim 45, and the code place being rotatably mounted and having mounting apertures, and a rotary carrier with protruding means locating and mounting the code plate on the periphery of the carrier.

* * * * *